(12) United States Patent
Wang et al.

(10) Patent No.: US 12,002,979 B2
(45) Date of Patent: Jun. 4, 2024

(54) ENERGY STORAGE BATTERY CABINET (71) Applicants: ZHEJIANG JINKO SOLAR CO., LTD., Zhejiang (CN); JINKO SOLAR CO., LTD., Jiangxi (CN)

(72) Inventors: Qinyun Wang, Zhejiang (CN); Yunhui Gao, Zhejiang (CN)

(73) Assignees: ZHEJIANG JINKO SOLAR CO., LTD., Haining Zhejiang (CN); JINKO SOLAR CO., LTD., Jiangxi (CN)

( * ) Notice: Subject to any disclaimer, the term of this patent is extended or adjusted under 35 U.S.C. 154(b) by 0 days.

(21) Appl. No.: 18/473,415

(22) Filed: Sep. 25, 2023

(65) Prior Publication Data

US 2024/0128563 A1 Apr. 18, 2024

(30) Foreign Application Priority Data

Oct. 13, 2022 (CN) .......................... 202222700085.7

(51) Int. Cl.
*H01M 50/204* (2021.01)
*H01M 50/296* (2021.01)
*H01M 50/298* (2021.01)

(52) U.S. Cl.
CPC ....... *H01M 50/204* (2021.01); *H01M 50/296* (2021.01); *H01M 50/298* (2021.01); *H01M 2220/10* (2013.01)

(58) Field of Classification Search
CPC .. H01M 50/24; H01M 50/209; H01M 50/296; H01M 50/298; H01M 2220/10; A47B 81/00
See application file for complete search history.

(56) References Cited

U.S. PATENT DOCUMENTS

| 10,511,001 | B1 | 12/2019 | Zhang et al. | |
| 10,608,419 | B2* | 3/2020 | Bach | H01M 50/262 |
| 10,916,953 | B2* | 2/2021 | Reber | H05K 7/18 |
| 2006/0028171 | A1* | 2/2006 | Marraffa | H01M 50/209 |
| | | | | 320/107 |
| 2006/0152906 | A1* | 7/2006 | Miller | H01M 10/627 |
| | | | | 361/716 |

(Continued)

FOREIGN PATENT DOCUMENTS

| CN | 205122662 U | 3/2016 |
| CN | 206293777 U | 6/2017 |

(Continued)

OTHER PUBLICATIONS

Zhejiang Jinko Solar Co., Ltd., et al., Extended European Search Report, EP 23202767.2, Feb. 6, 2024, 7 pgs.

*Primary Examiner* — Daniel J Rohrhoff
(74) *Attorney, Agent, or Firm* — USCH Law, PC (57) ABSTRACT

An energy storage battery cabinet including a housing is provided. The housing includes a main body, a first side door, and a second side door. The main body includes a panel, a back plate, a top plate, and a bottom plate. The top plate and the bottom plate are arranged opposite to each other and integrally formed with the panel and/or the back plate. The first side door and the second side door are respectively arranged on both sides of the main body and are detachably connected with the main body. A first inner side plate and a second inner side plate are further arranged on an inner side of the first side door and the second side door respectively.

12 Claims, 5 Drawing Sheets

(56) References Cited

U.S. PATENT DOCUMENTS

| | | | |
|---|---|---|---|
| 2007/0178369 A1* | 8/2007 | Conrardy | H01M 50/224 |
| | | | 206/703 |
| 2007/0278915 A1* | 12/2007 | Conrardy | H01M 50/262 |
| | | | 29/729 |
| 2008/0079340 A1* | 4/2008 | Adducci | H04Q 1/026 |
| | | | 312/286 |
| 2016/0037919 A1* | 2/2016 | Griffith | H05K 7/186 |
| | | | 312/286 |
| 2017/0294633 A1* | 10/2017 | Zimbru, Jr. | H01M 50/503 |
| 2022/0344768 A1* | 10/2022 | Wang | H01M 10/6563 |
| 2023/0344063 A1* | 10/2023 | Kim | H01M 50/204 |

FOREIGN PATENT DOCUMENTS

| | | | |
|---|---|---|---|
| CN | 206895118 U | | 1/2018 |
| CN | 107744274 A | * | 3/2018 |
| CN | 212277849 U | | 1/2021 |
| CN | 114664973 A | | 6/2022 |
| CN | 217036443 U | | 7/2022 |

* cited by examiner

ENERGY STORAGE BATTERY CABINET

CROSS REFERENCE TO RELATED APPLICATIONS

The present application claims the benefit of priority under the Paris Convention to Chinese Patent Application No. 202222700085.7 filed on Oct. 13, 2022, which is incorporated herein by reference in its entirety.

TECHNICAL FIELD

The various embodiments described in this document relate in general to the field of energy storage systems, and more specifically to an energy storage battery cabinet.

BACKGROUND

Energy storage cabinets are used for the installation and placement of battery packs, which have relatively high requirements for waterproof and dustproof performances. During the use of the energy storage cabinet, there are relatively high requirements on the convenience, space occupancy, and safety of the energy storage cabinet.

SUMMARY

In view of this, embodiments of the disclosure provide an energy storage battery cabinet.

In some embodiments, an energy storage battery cabinet is provided and includes a housing. The housing includes a main body, a first side door disposed on one side of the main body, and a second side door disposed on an other side of the main body. The main body includes a panel, a back plate, a top plate, and a bottom plate; the panel and the back plate are arranged opposite to each other and each have a rectangular shape, where the panel or the back plate has a width defined as a length of the housing, a distance between the panel and the back plate is defined as a width of the housing, where the width of the housing is smaller than the length of the housing; the top plate and the bottom plate are arranged opposite to each other and integrally formed with the panel and/or the back plate, and a distance between the top plate and the bottom plate is defined as a height of the housing; the first side door and the second side door are detachably connected with the main body respectively; the first side door and the second side door are each provided with a sealing ring at a corresponding inner edge of the first side door and the second side door; and the housing further includes a first inner side plate and a second inner side plate, where the first inner side plate is disposed between the first side door and the main body and detachably connected with the main body, and the second inner side plate is disposed between the second side door and the main body and detachably connected with the main body.

In some embodiments, the housing further includes at least one battery rack. Each battery rack includes a first rack and a second rack, where the first rack has a first support plane close to the top plate in a direction from the top plate to the bottom plate, and the second rack has a second support plane close to the top plate in a direction from the top plate to the bottom plate; and the first rack is disposed on an inner side of the panel, the second rack is disposed on an inner side of the back plate, and the first support plane and the second support plane are located at a same height relative to the bottom plate.

In some embodiments, the first rack is spaced apart from the second rack by a distance greater than 5 cm.

In some embodiments, the first rack and the second rack each have a rectangular longitudinal section.

In some embodiments, the first rack and the second rack are integrally formed with the main body; or the first rack is welded with the panel and the second rack is welded with the back plate.

In some embodiments, the energy storage battery cabinet further includes: two battery racks including a first battery rack and a second battery rack, where the first battery rack is disposed close to the bottom plate, and the second battery rack is disposed above the first battery rack; and at least one battery pack arranged in the housing. The second battery rack and the first battery rack define a first battery pack mounting region, and there is a second battery pack mounting region located above the second battery rack.

In some embodiments, the at least one battery pack is configured as two battery packs including a first battery pack and a second battery pack, where the first battery pack is located in the first battery pack mounting region, and the second battery pack is located in the second battery pack mounting region.

In some embodiments, the energy storage battery cabinet further includes a wiring region defined between the second battery pack mounting region and the top plate; and a cable outlet defined on the top plate. The wiring region is used for wiring of the first battery pack and the second battery pack and installation of switches.

In some embodiments, the energy storage battery cabinet further includes a corresponding positive wiring terminal and a corresponding negative wiring terminal that are disposed on a side of a respective battery pack close to the first side door or the second side door. The corresponding positive wiring terminal and the corresponding negative wiring terminal both are cable gland wiring terminals having a waterproof function.

In some embodiments, the housing further includes at least one hanger arranged at the top plate of the main body.

BRIEF DESCRIPTION OF THE DRAWINGS

The accompanying drawings, which are incorporated in and form a part of the specification, illustrate embodiments of the disclosure and, together with the description thereof, serve to explain the principles of the disclosure.

The reference numerals are illustrated as follows: 1—housing; 11—main body; 12—first side door; 13—second side door; 111—panel; 112—back plate; 113—top plate; 114—bottom plate; 14—first inner side plate; 15—second inner side plate; 16—sealing ring; 17—battery rack; 17a—first battery rack; 17b—second battery rack; 171—first rack; 172—second rack; 19—hanger; A1—first battery pack mounting region; A2—second battery pack mounting region; A3—wiring region; 2—battery pack; 21—first battery pack; 22—second battery pack; 211, 221—positive wiring terminal; 212, 222—negative wiring terminal; 25—cable outlet.

DETAILED DESCRIPTION OF THE EMBODIMENTS

Various exemplary embodiments of the disclosure will now be described in detail with reference to the accompanying drawings. It is to be noted that the relative arrangement, numeric expressions, and numerical values of the components and steps set forth in these embodiments do not limit the scope of the disclosure unless otherwise specified.

The following description of at least one exemplary embodiment is in fact illustrative only and is in no way intended to limit the disclosure and its application or use.

Techniques, methods, and devices known to those of ordinary skill in the relevant art may not be discussed in detail, but where appropriate, such techniques, methods, and devices should be regarded as part of the specification.

In all examples shown and discussed herein, any specific value should be interpreted as illustrative only and not as a limitation. Therefore, other examples of exemplary embodiments may have different values.

Without departing from the spirit or scope of the disclosure, various modifications and changes can be made in the disclosure, which is obvious to those skilled in the art. Therefore, the disclosure is intended to cover modifications and changes of the disclosure falling within the scope of the corresponding claims (the claimed technical proposal) and their equivalents. It is to be noted that the implementations provided by the embodiment of the disclosure can be combined with each other without contradiction.

It is to be noted that like numerals and letters denote like terms in the following drawings, and therefore, once an item is defined in one drawing, the item does not need to be further discussed in subsequent drawings.

The disclosure is described in detail with reference to the accompanying drawings.

In related technologies, battery packs are generally inserted into the energy storage battery cabinet from the front or one side of the energy storage battery cabinet. If the battery packs are inserted and installed into the energy storage cabinet from the front of the energy storage cabinet, the door of the front of the energy storage cabinet needs to be opened. However, there may be two problems when the cabinet is opened from the front door. First, an area of the front door opened may be relatively large, and the requirements for waterproof performance may increase. In addition, a depth between the front and back of the energy storage cabinet may increase, thus occupying more depth space. Furthermore, if the battery packs are installed from one side of the energy storage cabinet, when there are obstacles on the installation side, the installation difficulty and installation cost may be increased, so it is inconvenient for installation. Moreover, one-side door opening may increase the installation difficulty of some parts inside the housing due to the deep inner depth of the cabinet.

Compared with the related technologies, the energy storage battery cabinet provided in the disclosure at least achieves the following beneficial effects.

Convenient installation: firstly, since the energy storage battery cabinet can be opened from the doors on the left and right sides of the housing, compared with one-side door opening, the battery packs can be inserted from the left side or the right side, thus avoiding the installation inconvenience caused by one side of the cabinet being blocked by obstacles. Secondly, the energy storage battery cabinet further includes a battery rack in the housing, which can conveniently position the battery pack. The battery rack includes the first rack and the second rack, the first rack includes the first support plane, and the second rack includes a second support plane, and the first support plane and the second support plane are at the same height. During installation of the battery packs, the first support plane and the second support plane play the role of slide rails, so that the battery pack only needs to be directly pushed in from the left side or the right side of the housing. Furthermore, the first rack and the second rack of the disclosure are spaced apart from each other by a distance d, and the distance provides convenience for the installation of the battery rack and the installation of the battery packs.

High safety: firstly, the top plate and the bottom plate are arranged in the main body of the housing of the disclosure and form an integrated structure with the panel and/or the back plate. The integrated structure is helpful to enhance the sealing performance of the energy storage battery cabinet, and the connection between the top plate, the bottom plate, the panel, and the back plate does not need to take additional measures such as sealing and waterproof. Secondly, the first inner side plate and the second inner side plate are arranged inside the first side door and the second side door of the disclosure, and the waterproof and dustproof performances of the whole energy storage battery cabinet can be further improved through the first inner side plate and the second inner side plate. In addition, the whole energy storage battery cabinet of the disclosure is relatively thin and high. In order to adapt to the structure, at least one hanger is arranged at the top of the main body, and the hanger can fix the energy storage battery cabinet on the wall to prevent the cabinet from toppling and ensure the safe placement of the cabinet. Finally, both the positive wiring terminals and the negative wiring terminals of the battery pack of the disclosure adopt waterproof cable glands, which further improves the safety of the energy storage battery cabinet.

Any product implementing the utility model does not need to achieve all the technical effects mentioned above at the same time.

Other features and advantages of the utility model will become apparent from the following detailed description of exemplary embodiments of the utility model with reference to the accompanying drawings.

Figure 1:
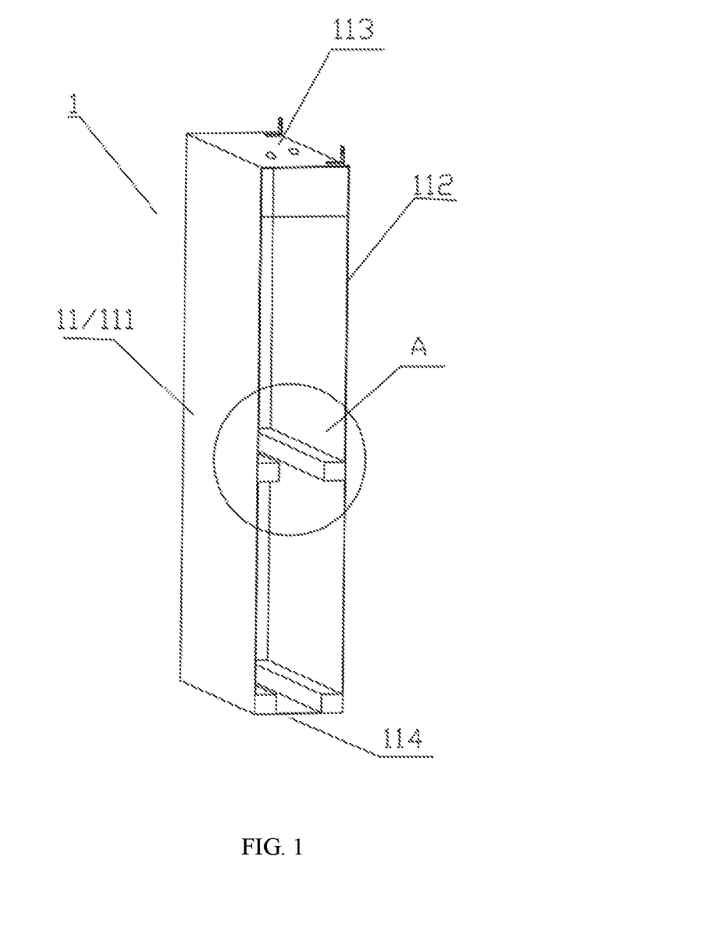
FIG. 1 is a schematic structural view of a housing of an energy storage cabinet after a second side door and a second inner side plate being opened according to embodiments of the disclosure.

For the energy storage battery cabinet provided in the disclosure, reference may be made to FIG. 1. The structure shown in FIG. 1 is a schematic structural view of a housing 1 of an energy storage cabinet after a second side door 13 and a second inner side plate 15 being opened according to embodiments of the disclosure. As illustrated in FIG. 1, the energy storage battery cabinet includes a housing 1. The housing 1 includes a main body 11. The main body 11 includes a panel 111, a back plate 112, a top plate 113, and a bottom plate 114. The panel 111 and the back plate 112 are arranged opposite to each other and are both rectangular, and a width of the panel 111 or the back plate 112 is a length of the housing 1. A distance between the panel 111 and the back plate 112 is a width of the housing 1. The width of the housing 1 is smaller than the length of the housing 1. The top plate 113 and the bottom plate 114 are disposed opposite to each other and are integrally formed with the panel 111 and/or the back plate 112. A distance between the top plate 113 and the bottom plate 114 is a height of the housing 1.

The main body 11 of the disclosure includes the panel 111, the back plate 112, the top plate 113, and the bottom plate 114. The panel 111 and the back plate 112 are arranged opposite to each other and are both rectangular. With this structure, the main body 11 is substantially in a shape of a cuboid, and the length of the cuboid is larger than the width of the cuboid, so that the energy storage cabinet presents a flat shape as a whole, which can be thinner and closer to the wall.

In addition, the top plate 113 and the bottom plate 114 of the disclosure are arranged opposite to each other and form an integrated structure with the panel 111 and/or the back plate 112. The integrated structure is helpful to enhance the sealing performance of the energy storage battery cabinet. That is, the connection between the top plate 113, the bottom plate 114, the panel 111, and the back plate 112 does not need to take additional sealed and waterproof measures.

Figure 2:
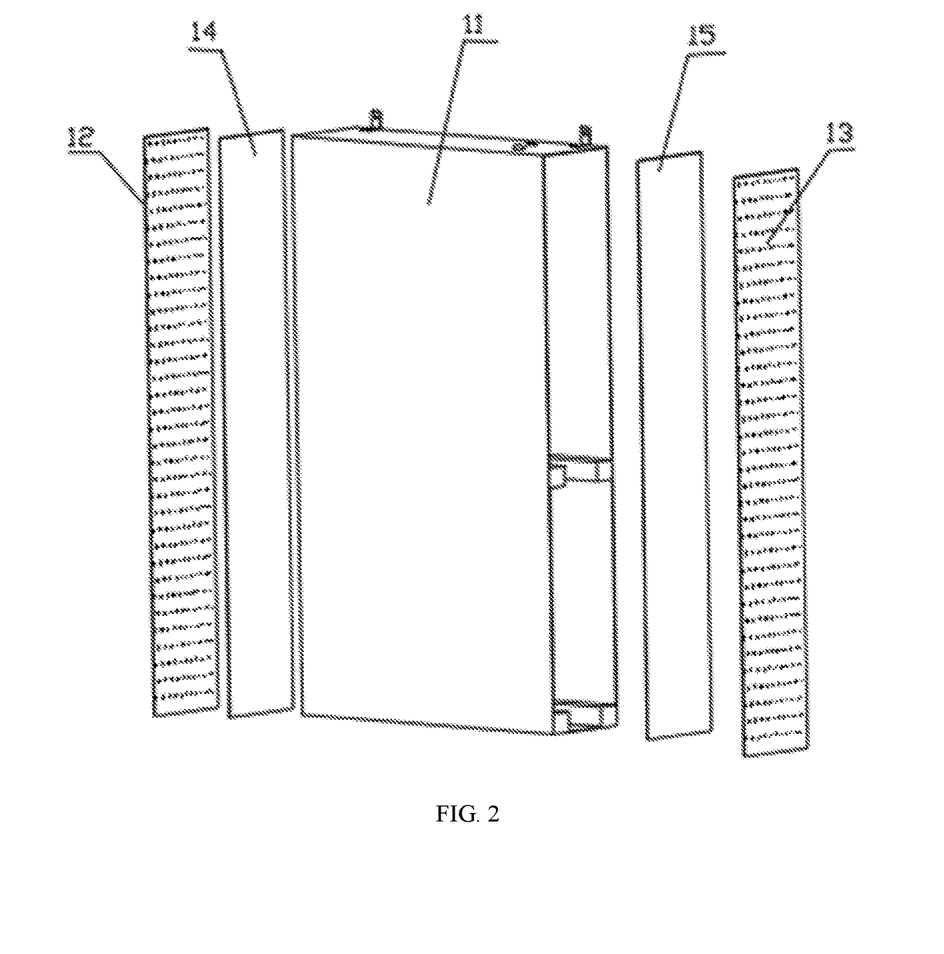
FIG. 2 is an exploded view of a housing of an energy storage cabinet according to embodiments of the disclosure.

FIG. 2 is an exploded view of a housing 1 of an energy storage cabinet according to embodiments of the disclosure. Please refer to FIG. 2, the housing 1 of the disclosure further includes a first side door 12 and a second side door 13 that are arranged on both sides of the main body 11. The first side door 12 and the second side door 13 are respectively provided on both sides of the main body 11 and are respectively detachably connected with the main body 11. The first side door 12 and the second side door 13 are each provided with a sealing ring 16 (not shown and may be a normal sealing structure) at a corresponding inner edge of the first side door 12 and the second side door 13. The first side door 12 and the second side door 13 and the main body 11 may be connected through a threaded fastener.

According to the disclosure, a side door opening structure may be adopted in the housing 1, the side door opening can save a front mounting space, thereby making the energy storage battery cabinet thinner and closer to the wall, and reducing the occupation of the front mounting space. In addition, left and right sides door opening may be achieved in the housing 1, and compared with one-side door opening, battery packs can be inserted from the left side and/or the right side of the hosing of the energy storage cabinet, thus avoiding mounting inconvenience caused by blocking of obstacles on one side of the cabinet.

Furthermore, if a ratio of the width to the length of the housing 1 is less than ½, an area to be sealed (sealing area) caused by opening the doors on the both sides is smaller than a sealing area caused by opening the door on the front side, thereby reducing the sealing difficulty.

Please continue to refer to FIG. 2. In order to better meet the requirements of waterproof and dustproof of the energy storage battery cabinet, the housing 1 of the disclosure further includes a first inner side plate 14 and a second inner side plate 15. The first inner side plate 14 and the second inner side plate 15 are respectively arranged on the left and right sides of the main body 11 and detachably connected with the main body 11 respectively. Specifically, the first inner side plate 14 is disposed between the first side door 12 and the main body 11, and the second inner side plate 15 is disposed between the second side door 13 and the main body 11. Each of the first inner side plate 14 and the second inner side plate 15 has a rectangular shape, and has a size adapted to an opening on the left side of the right side of the main body 11. The first inner side plate 14 and the second inner side plate 15 can also be connected with the main body 11 by means of threaded fasteners or through the insertion and connection mode. By arranging the first inner side plate 14 between the first side door 12 and the main body 11 and arranging the second inner side plate 15 between the second side door 13 and the main body 11, the waterproof and dustproof performances of the whole energy storage battery cabinet can be improved and the safety of the energy storage battery cabinet during use can be further increased.

Figure 3:
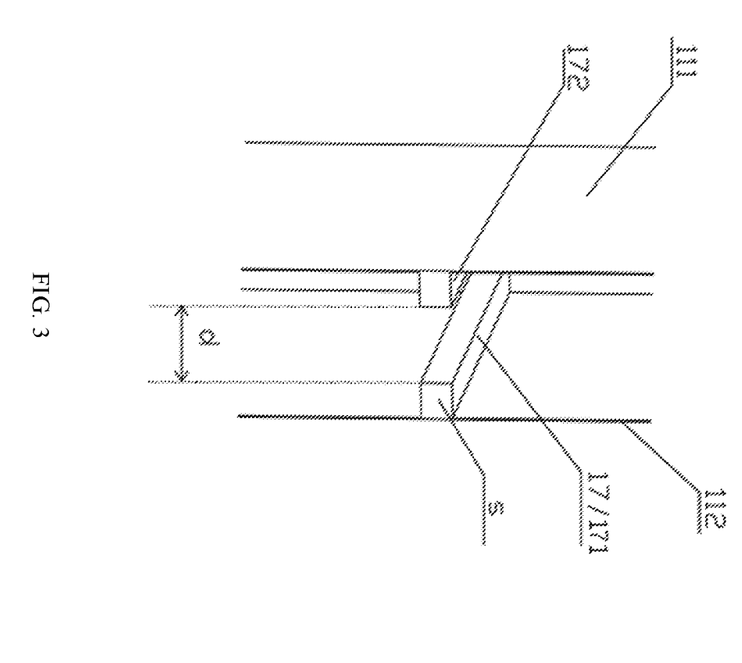
FIG. 3 is a partial enlarged view of part A in FIG. 1.

FIG. 3 is a partial enlarged view of part A in FIG. 1. Referring to FIG. 3, the housing 1 of the disclosure further includes a battery rack 17. The battery rack 17 includes a first rack 171 and a second rack 172. The first rack 171 has a first support plane close to the top plate in a direction from the top plate to the bottom plate, and the second rack 172 has a second support plane close to the top plate in the direction from the top plate to the bottom plate. The first rack 171 is disposed on an inner side the panel 111 and the second rack 172 is disposed on an inner side of the back plate 112. The first support plane and the second support plane are located at a same height relative to the bottom plate.

According to the disclosure, since the battery rack 17 is disposed in the housing 1, at least one battery pack 2 can be easily to be positioned and installed. In addition, the battery rack 17 of the disclosure includes the first rack 171 and the second rack 172, the first rack 171 includes the first support plane, the second rack 172 includes the second support plane, and the first support plane and the second support plane are located at the same height. With this configuration, the battery rack structure is simple in structure and easy to be installed. During mounting of the at least one battery pack 2, the first support plane and the second support plane can function as slide rails, and the at least one battery pack 2 can be initially installed only by directly pushing the at least one battery pack 2 into the housing 1 from the left side or the right side of the housing 1.

Furthermore, referring to FIG. 3, a distance d between the first rack 171 and the second rack 172 of the disclosure is greater than 5 cm.

Specifically, the first rack 171 being spaced apart from the second rack 172 by the distance d has following advantages. First, the first rack 171 and the second rack 172 are easy to be installed. For example, if the first rack 171 and the second rack 172 are connected with the main body 11 by welding, it is necessary to position the first rack 171 and the second rack 172 during welding of the first rack 171 and the second rack 172. In this case, the distance d between the first rack 171 and the second rack 172 provides a space for positioning operation. Furthermore, the distance d between the first rack 171 and the second rack 172 facilitates the installation of battery packs 2 in the future. Since cells may be heavy. During installation, it may be necessary to lift the battery pack 2 or apply force to adjust the battery pack 2. In this case, the distance d between the first rack 171 and the second rack 172 also provides a space for adjustment.

Referring to FIG. 3, optionally, a longitudinal section s of the first rack 171 and the second rack 172 of the present disclosure has a rectangular shape. Alternatively, the longitudinal section s of the first rack 171 and the second rack 172 may also have triangular or other shapes, but the first rack 171 and the second rack 172 each also have a support plane to support the battery pack 2.

Referring to FIG. 3, optionally, the first rack 171 and the second rack 172 may be integrally formed with the main body 11, or the first rack 171 is welded to the panel 111 and the second rack 172 is welded to the back plate 112, neither of which may affect the structural tightness of the back plate 112 and the panel 111.

Referring again to FIG. 3, when the first rack 171 and the second rack 172 are respectively connected with the corresponding panel 111 and the back plate 112 by welding, the disclosure provides convenience for welding by opening the door on the left and right sides of the housing 1. In other words, welding of the first rack 171 and the second rack 172 can be achieved from the left side or the right side of the housing 1, thus avoiding the inconvenience of one-side door opening welding and reducing the welding difficulty.

Figure 4:
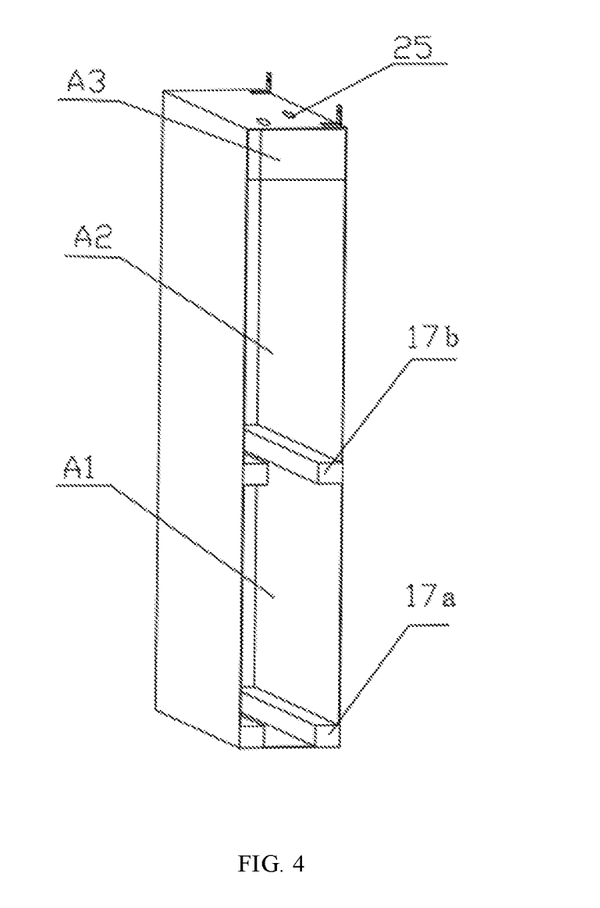
FIG. 4 is a schematic structural view of a housing of an energy storage cabinet after a first side door and a first inner side plate being opened according to other embodiments of the disclosure.

Further, as shown in FIG. 4, there are two battery racks 17 of the disclosure, including a first battery rack 17a and a second battery rack 17b. The first battery rack 17a is disposed close to the bottom of the housing 1 and the second battery rack 17b is located above the first battery rack 17a. The energy storage battery cabinet further includes battery packs 2 arranged in the housing 1. The second battery rack 17b and the first battery rack 17a define a first battery pack mounting region A1. A second battery pack mounting region is located above the second battery rack 17b. The second battery rack 17b and the top plate 113 define the second battery pack mounting region A2.

Specifically, in the disclosure, the battery packs 2 may be installed through the first battery rack 17a and the second battery rack 17b. Since the first battery rack 17a and the second battery rack 17b are sequentially arranged in a direction from the top plate 113 to the bottom plate 114, which can further reduce the depth of the housing 1 and make the whole housing 1 thinner. Further, as shown in FIG. 4, the first battery rack 17a is disposed close to the bottom of the housing 1, and the first support plane of the battery rack 17 is spaced apart by a certain distance from the bottom of the housing 1. Therefore, the first battery rack 17a can not only support and position the battery pack 2, but also have the function of waterproofing.

Figure 5:
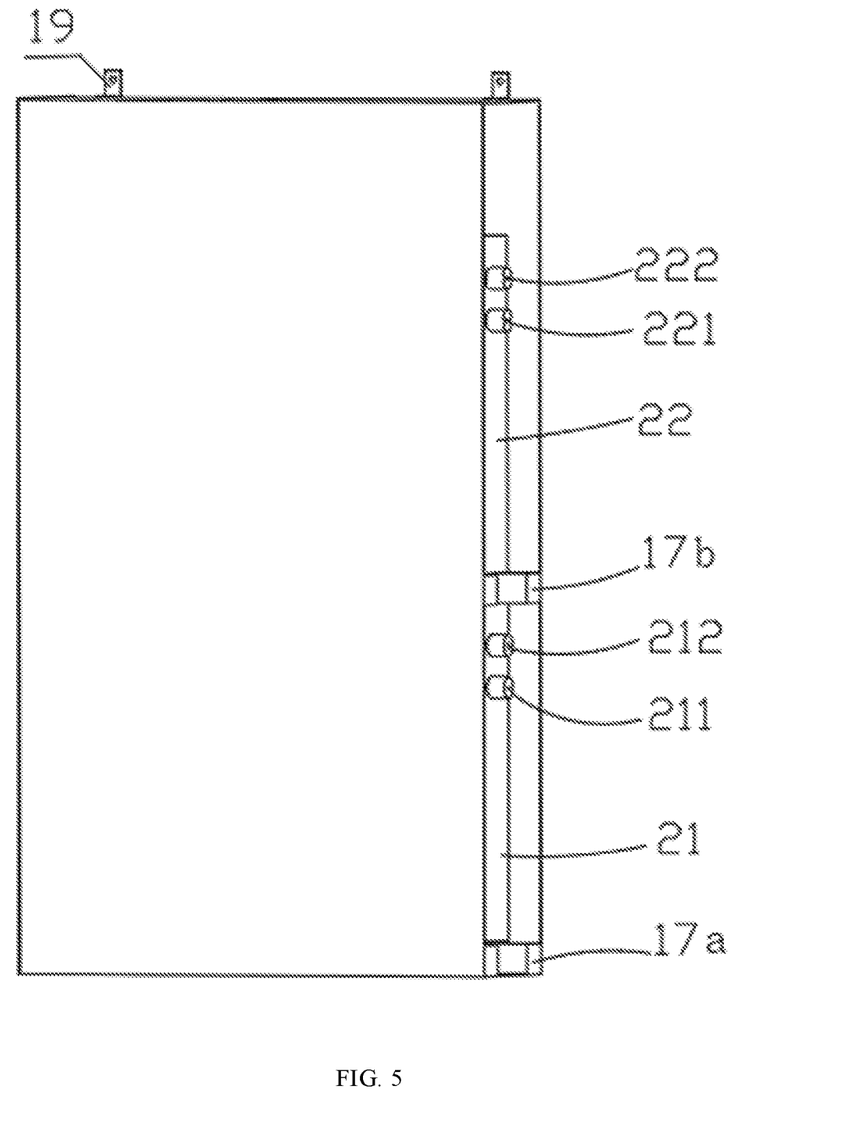
FIG. 5 is a structural schematic view of the housing of the energy storage cabinet with battery packs being installed according to embodiments of the disclosure.

FIG. 5 is a structural schematic view of the housing 1 of the energy storage cabinet with battery packs 2 being installed. Referring to FIG. 5, there are two battery packs 2 in the disclosure 1, including a first battery pack 21 and a second battery pack 22. The first battery pack 21 is located in the first battery pack mounting region A1. The second battery pack 22 is located in the second battery pack mounting region A2.

Please continue to refer to FIG. 4 and FIG. 5. Optionally, the housing 1 further includes a wiring region A3 defined between the second battery pack mounting region A2 and the top plate 113 of the disclosure. The top of the wiring region A3 (i.e., the top plate) defines a cable outlet 25 for leading out wires to outside. The wiring region A3 is used for wiring of the first battery pack 21 and the second battery pack 22 and installation of switches.

Specifically, in the configuration of the energy storage battery cabinet shown in FIG. 4 and FIG. 5, by providing the wiring region A3 for battery pack wiring and switch mounting above the second battery pack mounting region A2, and providing the cable outlet 25 at the top of the wiring region A3, it is possible to reduce to a certain extent the increase in the length of the housing 1 and the increase in the occupied area caused by providing the wiring region A3 on the left or right side of the housing 1.

Please continue to refer to FIG. 5, the energy storage battery cabinet of the disclosure further includes a positive wiring terminal 211 and a negative wiring terminal 212 that are disposed on a left side (a side where the first side door is located) of the first battery pack 21, and a positive wiring terminal 221 and a negative wiring terminal 222 that are disposed on a left side (the side where the first side door is located) of the second battery pack 22. In order to improve the safety of the energy storage battery cabinet, all positive and negative wiring terminals adopt waterproof cable glands.

Please continue to refer to FIG. 5, since the energy storage battery cabinet of the disclosure is substantially in a shape of the cuboid, and can be opened from the left and right sides (e.g., sides where the first side door and the second side door is located) of the housing, the length of the housing 1 is larger than the width of the housing 1, so that the housing 1 is relatively thin on the whole, but the energy storage battery cabinet is slightly higher in a height direction, and thus, is easily toppled. In order to ensure the safety of the energy storage battery cabinet during use, the housing 1 of the disclosure further includes at least one hanger 19 arranged at the top of the main body 11, such that the energy storage battery cabinet can be fixed on the wall through the hanger 19.

Therefore, the energy storage battery cabinet provided by the disclosure at least achieves the following beneficial effects.

Therefore, the main body 11 of the disclosure includes the panel 111, the back plate 112, the top plate 113, and the bottom plate 114. The panel 111 and the back plate 112 are arranged opposite to each other, and are both rectangular. The main body 11 is substantially in the shape of the cuboid, and the length of the cuboid is larger than the width of the cuboid, so that the energy storage cabinet presents a flat shape as a whole, and the whole cabinet is thinner and closer to the wall, thus saving the installation space in the width direction to a certain extent. In addition, the top plate 113 and the bottom plate 114 of the disclosure are arranged opposite to each other and form an integrated structure with the panel 111 and/or the back plate 112. The integrated structure is helpful to enhance the sealing performance of the energy storage battery cabinet, and the connection between the top plate 113, the bottom plate 114, the panel 111, and the back plate 112 does not need to take additional sealing and waterproofing measures. Furthermore, the energy storage battery cabinet is opened from the left and right sides of the housing 1, and the battery packs 2 can be inserted from the left side of the housing or can be inserted from the right side of the housing, so as to avoid inconvenience in installation caused by obstacles blocking one side of the cabinet. The at least one battery rack 17 is arranged in the housing 1, which can facilitate the positioning of the battery pack 2. In addition, each battery rack 17 includes the first rack 171 and the second rack 172, where the first rack 171 includes the first support plane, the second rack 172 includes the second support plane, and the first support plane and the second support plane are located at the same height. Therefore, with this configuration, the battery rack 17 is simple in structure, and easy to be installed. During installation of the battery packs 2, the first support plane and the second support plane function as slide rails, that is, the battery pack 2 only needs to be directly pushed in from the left side or the right side of the housing. Furthermore, the disclosure provides convenience for welding by opening the doors on the left and right sides of the housing 1, the first rack 171 and the second rack 172 can be welded from the left side of the housing 1, or can be welded from the right side of the housing 1, thus avoiding the inconvenience of one-side door opening and reducing the welding difficulty. Finally, the at least one hanger 19 is arranged on the top of the main body 11, and the energy storage battery cabinet can be fixed on the wall by the at least one hanger 19, so as to prevent the cabinet from toppling and ensure the safe placement of the cabinet.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "has," "having," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

In addition, when parts such as a layer, a film, a region, or a plate is referred to as being "on" another part, it may be "directly on" another part or may have another part present therebetween. In addition, when a part of a layer, film, region, plate, etc., is "directly on" another part, it means that no other part is positioned therebetween.

While some particular embodiments of the disclosure have been described in detail by way of example, those skilled in the art would understand that the above examples are for illustration only and are not intended to limit the scope of the disclosure. It will be understood by those skilled in the art that modifications may be made to the above embodiments without departing from the scope and spirit of the present disclosure. The scope of the disclosure is defined by the appended claims.

What is claimed is:

1. An energy storage battery cabinet, comprising a main body, a first side door disposed on one side of the main body, and a second side door disposed on another side of the main body, wherein
   the main body includes a panel, a back plate, a top plate, and a bottom plate;
   the panel and the back plate are arranged opposite to each other and are each in a shape of a rectangle, wherein the rectangle has a width that is greater than a first distance between the panel and the back plate;
   the top plate and the bottom plate are arranged opposite to each other and integrally formed with the panel and/or the back plate, and the top plate and the bottom plate are spaced apart from each other by a second distance; and
   the first side door and the second side door are respectively and detachably connected with the main body and disposed between the panel and the back plate;
   wherein the energy storage battery cabinet further comprises a first inner side plate and a second inner side plate, wherein the first inner side plate is disposed between the first side door and the main body and detachably connected with the main body, and the second inner side plate is disposed between the second side door and the main body and detachably connected with the main body; and
   wherein a ratio of the first distance to the width of the rectangle is less than ½.

2. The energy storage battery cabinet of claim 1, further comprising at least one battery rack between the top plate and the bottom plate, wherein
   each battery rack includes a first rack and a second rack, wherein the first rack has a first support plane closer to the top plate than to the bottom plate in a direction from the top plate to the bottom plate, and the second rack has a second support plane closer to the top plate than to the bottom plate in a direction from the top plate to the bottom plate; and
   the first rack is disposed on an inner side of the panel, the second rack is disposed on an inner side of the back plate, and the first support plane and the second support plane are located at a same height relative to the bottom plate;
   wherein the first support plane and the second support plane are configured to support a same battery pack.

3. The energy storage battery cabinet of claim 2, wherein the first rack is spaced apart from the second rack by a distance greater than 5 cm.

4. The energy storage battery cabinet of claim 2, wherein the first rack and the second rack each have a rectangular longitudinal section.

5. The energy storage battery cabinet of claim 2, wherein the first rack and the second rack are integrally formed with the main body.

6. The energy storage battery cabinet of claim 2, wherein the first rack is welded with the panel and the second rack is welded with the back plate.

7. The energy storage battery cabinet of claim 1, wherein the energy storage battery cabinet further comprises:
   two battery racks including a first battery rack and a second battery rack, wherein the first battery rack is disposed close to the bottom plate, and the second battery rack is disposed above the first battery rack; wherein
   the second battery rack and the first battery rack define a first battery pack mounting region, and there is a second battery pack mounting region located above the second battery rack.

8. The energy storage battery cabinet of claim 7, wherein the energy storage battery cabinet further comprises two battery packs arranged in the housing and including a first battery pack and a second battery pack, wherein the first battery pack is located in the first battery pack mounting region, and the second battery pack is located in the second battery pack mounting region.

9. The energy storage battery cabinet of claim 8, wherein the energy storage battery cabinet further comprises:
   a wiring region defined between the second battery pack mounting region and the top plate and used for wiring of the first battery pack and the second battery pack and installation of switches; and
   a cable outlet defined on the top plate.

10. The energy storage battery cabinet of claim 9, wherein the energy storage battery cabinet further comprises:
    a corresponding positive wiring terminal and a corresponding negative wiring terminal that are disposed on a side of a respective battery pack close to the first side door or the second side door, wherein
    the corresponding positive wiring terminal and the corresponding negative wiring terminal are cable gland wiring terminals having a waterproof function.

11. The energy storage battery cabinet of claim 1, further comprising:
    at least one hanger arranged at the top plate of the main body.

12. The energy storage battery cabinet of claim 1, wherein the first side door and the second side door are each provided with a sealing ring at a corresponding inner edge of the first side door and the second side door.

* * * * *